United States Patent [19]
Eisenberg et al.

[11] Patent Number: 5,627,697
[45] Date of Patent: May 6, 1997

[54] CIRCUIT ARRANGEMENT FOR MOTOR SPEED CONTROL

[75] Inventors: Gerd Eisenberg, Rossdorf; Werner Laurentius, Gross Zimmern, both of Germany

[73] Assignee: U.S. Philips Corporation, New York, N.Y.

[21] Appl. No.: 584,998

[22] Filed: Jan. 11, 1996

Related U.S. Application Data

[63] Continuation of Ser. No. 445,982, May 22, 1995, abandoned, which is a continuation of Ser. No. 323,190, Oct. 14, 1994, abandoned, which is a continuation of Ser. No. 963,649, Oct. 20, 1992, abandoned.

[30] Foreign Application Priority Data

Oct. 25, 1991 [DE] Germany ............... 41 35 209.2

[51] Int. Cl.⁶ .................................... G11B 15/54
[52] U.S. Cl. ............................ 360/73.14; 360/73.04; 318/603; 388/815
[58] Field of Search ................... 360/73.04, 73.11, 360/73.09, 73.14, 73.01, 71, 73.05, 73.08; 318/600, 601, 603; 388/800, 801, 809, 815

[56] References Cited

U.S. PATENT DOCUMENTS

| | | | |
|---|---|---|---|
| 3,978,521 | 8/1976 | Langer et al. | 360/73.14 X |
| 4,210,940 | 7/1980 | Prysby et al. | 360/72.3 X |
| 4,323,832 | 4/1982 | Okamura | 388/811 |
| 5,119,249 | 6/1992 | Uchikoshi | 360/77.15 |

FOREIGN PATENT DOCUMENTS

| | | | |
|---|---|---|---|
| 59-124054 | 7/1984 | Japan | 360/73.08 |

*Primary Examiner*—Aristotelis Psitos
*Assistant Examiner*—James L. Habermehl
*Attorney, Agent, or Firm*—Edward Blocker

[57] ABSTRACT

A digital servo control with improved control accuracy, in which the arithmetical mean of a sequential series of n data words is used as a basis for the nominal value for a NOMINAL/ACTUAL value comparison to derive a setting signal. Depending on the value of the arithmetical mean, also intermediate values of adjacent quantization stages may thus be included and taken into consideration for control purposes.

9 Claims, 3 Drawing Sheets

CIRCUIT ARRANGEMENT FOR MOTOR SPEED CONTROL

This is a continuation of application Ser. No. 08/445,982, filed May 22, 1995 now abandoned, which is a continuation of application Ser. No. 08/323,190, filed Oct. 14, 1994 now abandoned, which is a continuation of application Ser. No. 07/963,649, filed Oct. 20, 1992 now abandoned.

FIELD OF THE INVENTION

The invention relates to a circuit arrangement for controlling the speed of rotation of a motor specifically a capstan motor for a magnetic tape recorder.

BACKGROUND OF THE INVENTION

In a magnetic tape recorder a capstan servo control controls the transport speed of a magnetic tape. The magnetic tape then engages with the shaft of a capstan motor. The speed of the shaft is measured by counting clock pulses produced between two successive speed pulses. A speed error is obtained by the subtraction of a set value from the actually counted number of revolutions. Such a servo arrangement is known from DE-PS-28 33 981.

The speed pulses are customarily produced by optically scanning a tacho disc which is rigidly connected to the shaft of the capstan motor. For achieving sufficient control accuracy, a line graduation applied to the tacho disc should have a very fine structure for obtaining a maximum number of speed pulses per revolution of the tacho disc. However, the number of equidistant lines may not be arbitrarily increased for reasons of typography, because errors in the line graduation also detrimentally affect the accuracy of control.

SUMMARY OF THE INVENTION

Therefore, it is an object of the; present invention to improve the accuracy of control in a circuit arrangement of the type mentioned in the opening paragraph.

This object is achieved by producing a series of data words whose arithmetical mean constitutes a nominal value. The series of data words is compared with an actual value that can be tapped from the output of a counter. This comparison produces a setting signal which controls the speed of rotation of the motor. Because the data words are incremented or decremented by finite whole values, it leaves intervals between the finite whole values which cannot be used for motor control. Applicants use the series of data words to create an arithmetical mean which can fall within these intervals, thereby providing more accurate control of motor speed.

The circuit arrangement according to the invention is of advantage in that adjacent-valued digital values which are separated by a finite value interval ("0", "1") as a result of quantization, present a fine graduation when used in connection with a servo circuit, so that the accuracy with respect to time is enhanced without changing the existing line graduation of a tacho disc.

BRIEF DESCRIPTION OF THE DRAWINGS

An exemplary embodiment of the invention is represented in the drawing and further explained in the following description, wherein.

DETAILED DESCRIPTION OF THE PREFERRED EMBODIMENT

Figure 1:
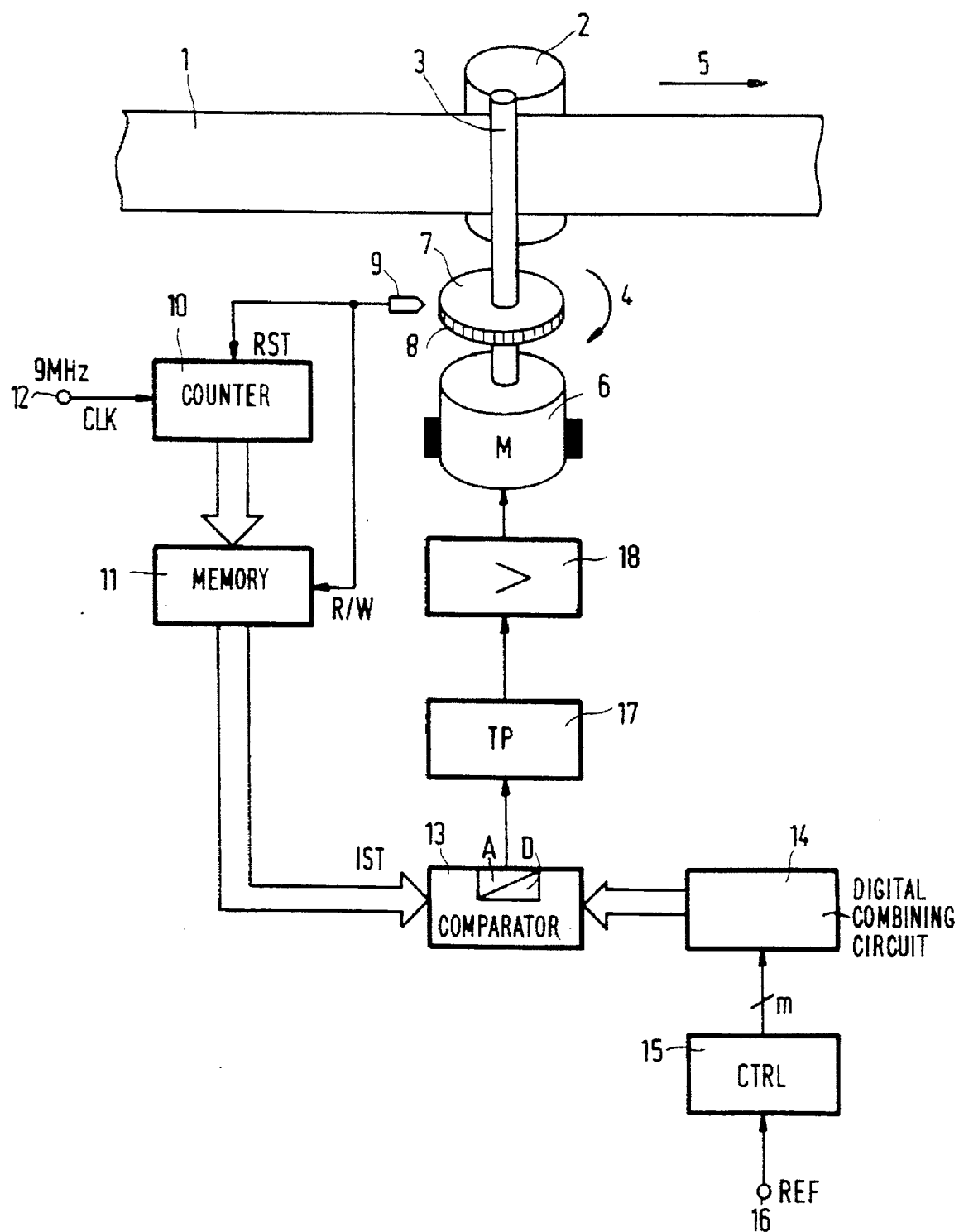
FIG. 1 shows a block diagram in accordance with the invention.

Reference character 1 in FIG. 1 denotes a magnetic tape which is pressed against a capstan shaft 3 by a pressure roller. When the capstan shaft 3 revolves in the direction of an arrow 4 the magnetic tape 1 is moved in the direction of an arrow 5. The capstan shaft 3 is driven by a capstan motor 6. For determining the speed of rotation of the capstan motor 6, the capstan shaft 3 comprises, rigidly attached thereto, a tacho disc 7 which in the present exemplary embodiment has a specific line graduation along its circumference.

It is assumed that n lines are applied equidistantly along the circumference of the tacho disc 7, so that when the tacho disc 7 is optically scanned by a scanning element 9 there will be n speed pulses during each revolution of the tacho disc 7. A speed pulse signal tapped from the scanning element 9 is applied to the reset input RST of a counter 10 as well as the read/write input R/W of a memory 11. A high-frequency clock signal is present at a clock input CLK (terminal 12) of the counter 10. The pulse repetition frequency of this clock signal is much higher than the pulse repetition frequency of the speed pulse signal, provided that there is a normal recording operation. When a clock signal is used having a pulse repetition frequency of 9 MHz and the speed pulse signal has a pulse repetition frequency of 3 kHz, the counter 10 will produce the value of 3000 (digital actual value). If, due to a change of the speed of rotation of the tacho disc 7, the pulse repetition frequency of the speed pulse signal changes, the result can be tapped from the output of the counter 10, and thus the digital actual value, will change in accordance with the ratio of the pulse repetition frequency of the clock signal to that of the speed pulse signal.

The obtained digital actual value is buffered in the memory 11; at the same time the counter 10 is reset and the counting operation is recommenced. The digital actual value available at the output of the memory 11 is applied to an ACTUAL input of a NOMINAL/ACTUAL value comparator 13. In response to a nominal/actual value comparison of available digital values, the NOMINAL/ACTUAL value comparator 13 produces a digital setting quantity which is subsequently subjected to digital-to-analog conversion for deriving an analog setting signal therefrom.

Figure 3:
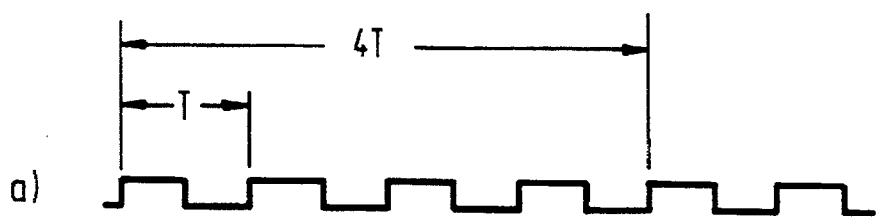
Figure 4:
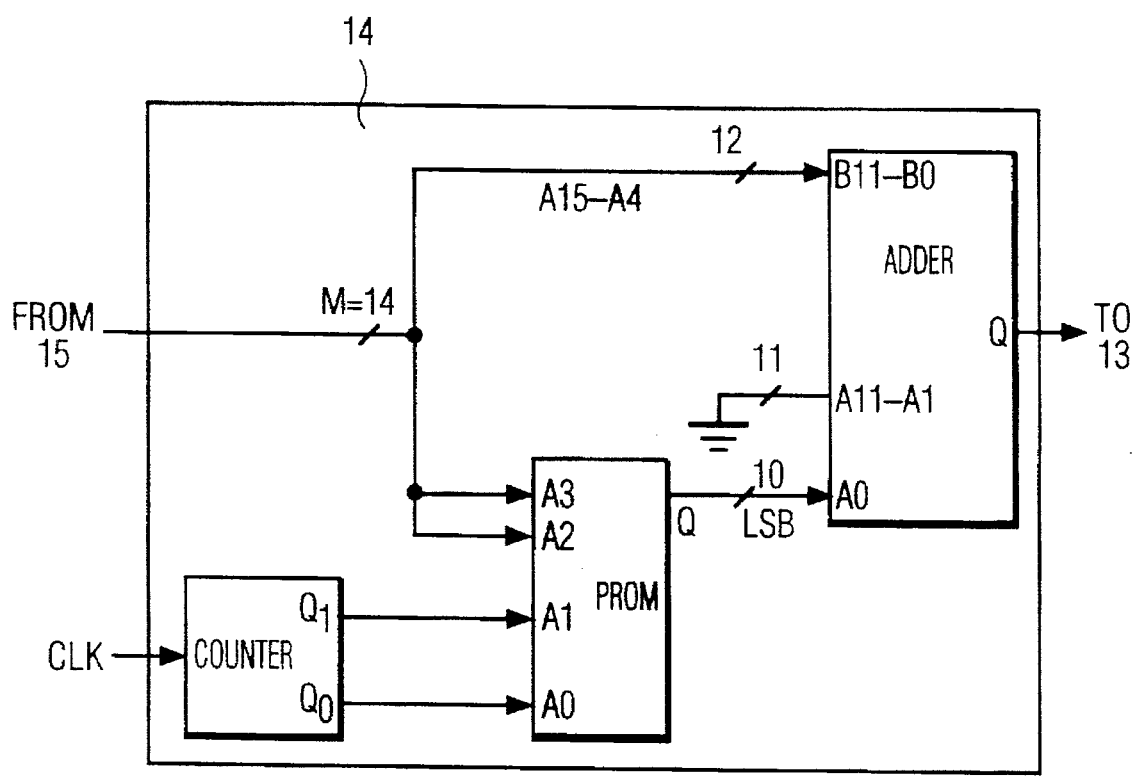

At a NOMINAL input of the digital NOMINAL/ACTUAL value comparator 13 a sequential series of data words (for a digital nominal value) is available, whose arithmetical mean also contains intermediate values of adjacent data words which, as a result of their quantization, cannot be available, in principle, as separate data words. In order to clarify these circumstances, reference is made to the representation of FIG. 3. Line a of FIG. 3 represents the pulse variation of a speed pulse signal tapped from the scanning element 9. T denotes therein the duration of one speed pulse period and 4T the duration of 4 speed pulse periods. It is assumed that the sequential series of data words representing a digital nominal value comprises four speed pulse periods and that in accordance with line b of FIG. 3 the following digital nominal values: 3000, 3000, 3000 and 3000 are applied to the NOMINAL input of the digital phase comparator 13 in a word-alternating fashion. The arithmetical mean of this sequential series of data words is the digital nominal value 3000.00. If one of the nominal values in the sequential series of dam words of the duration 4T adopts the value 3001, according to line c of FIG. 3, the digital nominal value will adopt the value 3000.25. Accordingly, in accordance with line d of FIG. 3, if two data words of the value 3001 and two data words of the value 3000 are available, the digital nominal value will be 3000.50 and, in accordance with line e of FIG. 3, the digital nominal value will be 3000.75 if three data words of the value 3001 and one data word of the value 3000 are available.

Each series of data words is produced in a digital combining circuit 14 which is driven by a control unit 15. The control unit 15 in combination with the reference signal 16 provides the arithmetic means to be produced by the digital combining circuit using a series of data words. The digital combining circuit 14 comprises, for example, an arrangement of counters for determining the duration of the series of data words and the value of the data words which are to be produced each time. A digital nominal value is produced by the control unit 15, sent to the digital combining circuit which creates a series of data words. Control unit 15 is synchronized by a reference signal available at a terminal 16 which is connected to the digital combining circuit 14 by way of an m-bit wide data bus, where m is greater than the number of bits of the NOMINAL input of the NOMINAL/ACTUAL value comparator 13. In the control unit 15 the 9 MHz clock signal is produced, and the reference signal is available at terminal 16.

The analog setting signal which can be tapped from the output of the NOMINAL/ACTUAL value comparator 13 is applied, via a low-pass filter 17, to a motor output stage 18 and amplified there. A setting signal which can be tapped from the output of the motor output stage 18 controls the speed of rotation of capstan motor 6.

Figure 2:
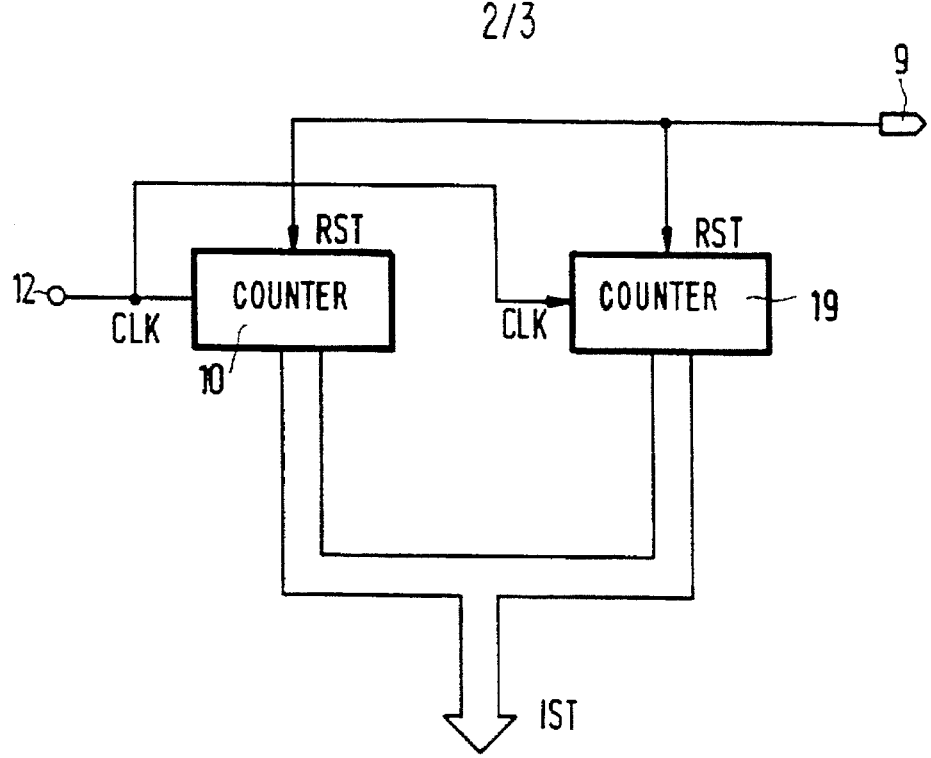
FIG. 2 shows the block diagram of a further embodiment for determining actual values in accordance with the invention, and FIG. 3 gives a representation of the series of data words which drive a nominal value.

FIG. 2 shows the block diagram of a further embodiment for determining the digital actual value to be used by the digital combining circuit 15. In FIG. 2 the components that correspond to those shown in FIG. 1 are denoted by like reference characters. This further embodiment comprises a second counter 19, arranged in parallel with the counter 10, which is also supplied with the clock signal available at the terminal 12 and the speed pulse signal produced by the scanning element 9. The speed pulse signal is also applied to an inverting input of the counter so that, under the control of the speed pulse signal, the two counters alternately count clocks of the clock signal available at terminal 12 and, alternately apply the detected digital actual values to the digital phase comparator 13.

In the present exemplary embodiment it was assumed that a sequential series of data words which improves comprised four data words: the accuracy with which the capstan servo control can be set by a factor of four. For better setting accuracy, the number of data words may be increased. However, in this case it should be considered that the control time constant can be adjusted accordingly.

In a capstan servo control the fielding speed of the magnetic tape 1 depends, in essence, on the diameter of the capstan shaft 3 as well as the speed of rotation of the capstan shaft 3. Since the oblique tracks recorded on magnetic tape nowadays are not more than a few micrometers wide (about 20 μm), strict requirements are to be made on the dimensional stability of the capstan shaft 3. Tolerances in point of product engineering of a capstan shaft and the entailing track deviations may be corrected by applying a specific sequential series of data words to a NOMINAL input of the NOMINAL/ACTUAL value comparator 13. The sequential series of data words to be used for this correction may be determined, for example, during an initialization phase by measuring the feeding speed of the magnetic tape 1, while the control pulses recorded on a control track of the magnetic tape 1 can be utilized.

The invention has been explained, for example, with the aid of a capstan servo control. Needless to observe that this principle may also be applied with the same degree of success to other digital control circuits.

We claim:

1. A circuit for controlling the speed of rotation of a motor, comprising:

scanning means for producing a speed pulse signal having a frequency dependent upon the rotational speed of the motor;

counter means for receiving a clock signal having a pulse repetition frequency higher than the speed pulse signal frequency and for counting pulses of the clock signal which occur between pulses of the speed pulse signal to produce an actual speed value which is quantized in steps of a first size corresponding to the pulse repetition frequency of the clock signal;

combining means for producing a series of data words corresponding to nominal speed values of the motor, each data word in said series being quantized in steps of said first size and having one of two adjacent values, said series of data words having an arithmetical mean corresponding to a nominal speed value that may fall between said two adjacent values in quantization steps of a second size smaller than said first size; and comparison means for receiving and comparing the nominal speed values and the actual speed value to produce a motor speed setting signal having an average value which is quantized in steps of said second size.

2. The circuit arranged as claimed in claim 1, further including buffer means for buffering the actual speed value.

3. The circuit arrangement as claimed in claim 1, wherein the counter means comprises two counters which alternately count pulses of the clock signal and each counter alternately apply an actual value to the comparison means.

4. The circuit arrangement as claimed in claim 1, wherein the scanning means further includes a tacho disk having predetermined line graduations, detection of the line graduations provides the speed pulse signal and the series of data words produced by said combining means provides an accuracy with respect to time greater than the accuracy provided by the predetermined line graduations.

5. A circuit for controlling the speed of rotation of a capstan motor for a magnetic tape recorder, comprising:

scanning means for producing a speed pulse signal having a frequency dependent upon the rotational speed of the motor;

counter means for receiving a clock signal having a pulse repetition frequency higher than the speed pulse signal frequency and for counting pulses of the clock signal which occur between pulses of the speed pulse signal to produce an actual speed value which is quantized in steps of a first size corresponding to the pulse repetition frequency of the clock signal;

combining means for producing a series of data words corresponding to nominal speed values of the motor, each data word in said series being quantized in steps of said first size and having one of two adjacent values, the series of data words having an arithmetical mean corresponding to a nominal speed value that may fall between said two adjacent values in quantization steps of a second size smaller than said first size; and comparison means for receiving and comparing the nominal speed values and the actual speed value to produce a motor speed setting signal having an average value which is quantized in steps of said second size; and a low pass filter for smoothing the setting signal for servo control of the rotation speed of the motor in quantization steps of said second size.

6. The circuit arranged as claimed in claim 5, further including a memory wherein the actual value is buffered.

7. The circuit arrangement as claimed in claim 5, wherein the counter means comprises two counters which alternately count pulses of the clock signal and each counter alternately applies an actual value to the comparison means.

8. A circuit for controlling the speed of rotation of a capstan motor for a magnetic tape recorder, comprising:

scanning means for producing a speed pulse signal having a frequency dependent upon the rotational speed of the motor, said scanning means including a tacho disc having predetermined line graduations such that detection of the line graduations provides the speed pulse signal;

counter means, including a reset input for receiving the speed pulse signal and a clock input for receiving a clock signal having a pulse repetition frequency higher than the speed pulse signal frequency, for counting pulses of the clock signal which occur between pulses of the speed pulse signal to produce an actual motor speed value which is quantized in steps of a first size corresponding to the pulse repetition frequency of the clock signal;

a memory to receive and buffer the actual motor speed value;

combining means for receiving a command and producing a series of data words corresponding to nominal speed values of the motor, each data word in said series being quantized in steps of said first size and having one of two adjacent values, the series of data words having an arithmetic mean corresponding to the command, the arithmetic mean constituting a nominal speed value that may fall between said two adjacent values in quantization steps of a second size smaller than said first size, whereby the series of data words provides said nominal speed value with an accuracy which is greater than the accuracy provided by the predetermined line graduations; and comparison means for receiving and comparing the actual speed value and the series of data words to produce a setting signal corresponding to the difference between the actual speed value and the nominal speed value, for setting the speed of the motor to correspond with the nominal speed value in quantization steps of said second size.

9. The circuit according to claim 8 wherein the series of data words include four data words.

* * * * *